Aug. 26, 1924.
K. E. LYMAN
1,506,018
PLUNGER FOR GREASE GUNS
Filed Aug. 6, 1921
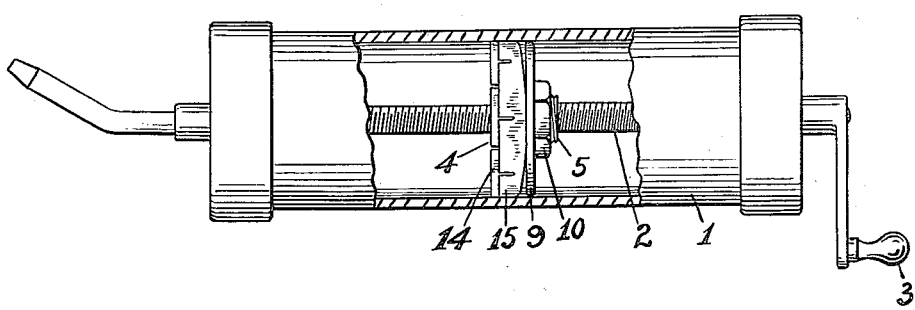
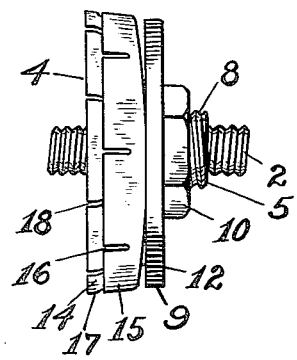
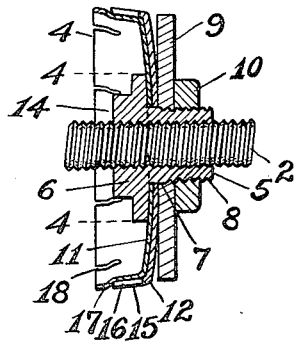
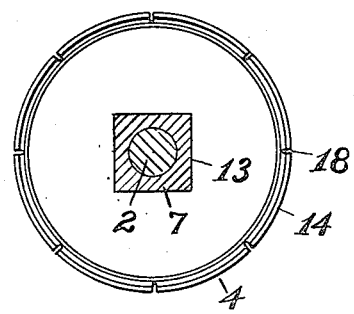
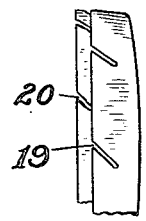
Inventor
K. E. Lyman
By G. E. Dunstan,
his Attorney Patented Aug. 26, 1924.

1,506,018

UNITED STATES PATENT OFFICE.

KENT E. LYMAN, OF CLEVELAND, OHIO.

PLUNGER FOR GREASE GUNS.

Application filed August 6, 1921. Serial No. 490,244.

*To all whom it may concern:*

Be it known that I, KENT E. LYMAN, a citizen of the United States, residing at Cleveland, in the county of Cuyahoga and State of Ohio, have invented certain new and useful Improvements in Plungers for Grease Guns, of which the following is a specification.

This invention relates to grease guns, and more particularly to plungers for grease guns.

The main object of the invention is to provide a plunger for grease guns and the like, which will force the contents thereof with great pressure without danger of same leaking past the plunger to the rear side thereof.

Another object of the invention is to provide a plunger for grease guns, which is of simple and practical construction and depends for tightness upon resilient metal discs.

In order that the invention may be clearly understood, the same will be hereinafter fully described as illustrated in the accompanying drawings, and the novel features thereof will be distinctly pointed out in the appended claims.

Figure 1 is a side elevation of a grease gun with a portion broken away to show a plunger constructed in accordance with my invention, Fig. 2 is a side view of the plunger on an enlarged scale.

Fig. 3 is a longitudinal view of the plunger,

Fig. 4 is a cross sectional view of the plunger taken on line 4—4 of Fig. 3, and Fig. 5 is a side view illustrating the cupped washers of the plunger illustrating a modification of the slots therein.

Referring to the drawings, 1 represents the barrel of a grease gun, in which is rotatably mounted a threaded screw 2 provided at its outer end with a suitable handle 3 for turning the same. The threaded screw 2 is adapted to actuate the plunger as 4 longitudinally within the barrel for the purpose and in the manner well known.

In the present practice of lubricating bearings of automobiles and other machinery by forcing oil or grease therein with great pressure, it has been found that the oil or grease leaks by the plunger to the rear side thereof, and the plunger of this invention and now to be described has been designed to prevent such leakage. The plunger consists of an internally threaded sleeve 5 for receiving the threaded screw 2, and is reciprocated by the turning of same. Said sleeve is provided with a head 6 at its inner end, an internal square portion 7 adjacent thereto, and beyond this an external threaded outer end 8 for receiving a backing plate or disc 9, and a locking nut 10 to hold the same thereon. The backing plate 9 is substantially of the same diameter as the bore of the barrel 1 of the grease gun, and held between the head 6 and said backing plate upon the square portion 7 of the sleeve is an inner cup washer 11 and an outer cup washer 12. Said washers are provided with central square openings as at 13 for fitting the square portion 7 of the sleeve 5 so that one cannot rotate relatively to the other upon said sleeve. Both of said washers are constructed of resilient sheet material, but the outer washer is preferably made of heavier gauge metal. The washers are convex and substantially the same diameter as the bore of the barrel 1 of the grease gun and have slightly outwardly tapering peripheral flanges 14 and 15. The flange 15 of the outer washer 12 is just a little larger in diameter than the bore of the barrel of the grease gun, and is slotted at 16 so that it may be contracted and thereby snugly fit into and will fill the same. The flange 14 of the inner washer 11 extends beyond the flange 15, and is increased in diameter at 17 to correspond with the diameter thereof. This flange is also slotted, but at points 18 which are intermediate between the slots 16 of the other flange. As the slots 16 and 18 of the flanges of the washers are arranged with a certain relation to the square openings thereof at 13, rotary movement of the washers relative to each other is prevented, and consequently the registration of the slots of each washer is avoided. This provides a snugly fitting plunger, and the greater the pressure behind the plunger the more snugly its flanges press against the inner side of the barrel of the grease gun and against each other due to the convex form of the washers, thereby preventing leakage to the rear side thereof.

Instead of providing straight slots as 16 and 18 in the flanges of the cupped washers, angular slots as 19 and 20 may be provided.

Altho the invention has been described as applied to a grease gun, it will be understood that a plunger of this construction is also adapted for use in connection with a force pump. It will also be understood that slight changes in the details of construction may be made within the scope of the claims.

Having fully described my invention what I claim is:

1. In a plunger for grease guns and the like, the combination of a washer, the washer being constructed of resilient material and being convex, the washer having a flange, and the flange being slotted, substantially as described.

2. In a plunger for grease guns and the like, the combination of a washer, the washer having a flange, the flange being slotted, an inner washer, the inner washer having a flange, the flange of the inner washer being slotted at points intermediate the slots of the outer washer, and the washers being provided with rectangular openings for fitting a supporting means for preventing the rotation of the washers relative to each other, substantially as described.

3. In a plunger for grease guns and the like, the combination of a washer, the washer being constructed of resilient material and being convex, a straight backing plate for the washer, and means for forcing said backing plate against said washer, substantially as described.

4. In a plunger for grease guns and the like, the combination of an outer washer, the outer washer having a flange, the flange tapering outwardly, the flange being slotted, an inner washer, the inner washer having a flange, the flange of the inner washer extending beyond the flange of the outer washer, the flange of the inner washer being slotted, said washers being convex, a backing plate adjacent the outer washer, and means for forcing said backing plate against the outer washer, substantially as described.

5. In a plunger for grease guns and the like, the combination of a sleeve, the sleeve having a head, the sleeve having a square portion adjacent the head, an inner washer and an outer washer, said washers being provided with square openings for fitting said square portion of the sleeve, means for holding said washers upon the sleeve, said washers having flanges, the flange of the outer washer being slotted, and the flange of the inner washer being slotted at points intermediate the slot of the outer washer, substantially as described.

6. In a plunger for grease guns and the like, the combination of a sleeve, the sleeve having a head, the sleeve having a square portion adjacent the head, an inner washer and an outer washer, said washers being convex, said washers being provided with square openings for fitting said square portion of the sleeve, a backing plate upon said sleeve for said outer washer, means for holding the backing plate against said washers upon the sleeve, said washers having flanges, said flanges being provided with staggered slots, and means for reciprocating said sleeve, substantially as described.

In testimony whereof I affix my signature.

KENT E. LYMAN.